United States Patent [19]

Costick et al.

[11] 4,172,312
[45] Oct. 30, 1979

[54] METHOD OF MAKING EXPANDABLE SEAL FOR USE BETWEEN A RECUPERATOR TUBE AND RECUPERATOR

[75] Inventors: James A. Costick, Whitstable; Brian Hall, Norbury, both of England

[73] Assignee: British Steel Corporation, London, England

[21] Appl. No.: 933,849

[22] Filed: Aug. 15, 1978

Related U.S. Application Data

[63] Continuation of Ser. No. 721,328, Sep. 7, 1976, abandoned.

[30] Foreign Application Priority Data

Sep. 8, 1975 [GB] United Kingdom ............... 36876/75

[51] Int. Cl.² ............................................. B29D 23/00
[52] U.S. Cl. ................................... 29/157.4; 29/157.5; 165/178; 156/155; 156/165; 156/188; 156/190; 156/194
[58] Field of Search ...................... 156/62.6, 165, 187, 156/189, 190, 194, 188, 218; 165/178; 29/157.4, 157.5

[56] References Cited

U.S. PATENT DOCUMENTS

| | | | |
|---|---|---|---|
| 2,946,371 | 7/1960 | Stephens et al. | 156/62.6 |
| 3,063,887 | 11/1962 | Labino | 156/187 |
| 3,549,456 | 12/1970 | Stephen et al. | 156/218 |
| 3,623,928 | 11/1971 | Wincklhofer et al. | 156/156 |
| 3,696,862 | 10/1972 | Dijk | 165/178 |
| 3,740,291 | 7/1973 | Mallard | 156/187 |
| 3,757,829 | 9/1973 | Berry et al. | 156/187 |
| 3,930,926 | 1/1976 | Loeffler | 156/62.6 |
| 3,940,837 | 3/1976 | Wiese | 29/157.5 |
| 4,026,456 | 5/1977 | Lema | 29/157.4 |

Primary Examiner—Jerome W. Massie
Attorney, Agent, or Firm—Bacon & Thomas

[57] ABSTRACT

A method of manufacturing an annular seal for a heat recuperator tube end is disclosed as comprising loosely wrapping without appreciable tension at least one layer of a compressible and resilient blanket of unbonded ceramic fibers about an annular forming mandrel, stabilizing the inner area of the fiber layer, thereafter compressing the fibers to decrease their volume while not destroying the recuperative ability of the fibers to resiliently expand back to a volume substantially greater than their compressed volume when the compression is released by wrapping a retainer exteriorly of the fibers to compress them and to temporarily retain them in compressed condition, the retainer being destructable at operating temperatures of the tube ends of the recuperator in which the seal is to be used. A specific wrapping process utilizing overlapping sheets of heat destructable wrapping material is disclosed.

10 Claims, 9 Drawing Figures

METHOD OF MAKING EXPANDABLE SEAL FOR USE BETWEEN A RECUPERATOR TUBE AND RECUPERATOR

This is a continuation of application Ser. No. 721,328, filed Sept. 7, 1976, now abandoned.

This invention relates to recuperators, and in particular to recuperators of the type which incorporate ceramic refractory tubes.

The advantages of recuperators incorporating ceramic refractory tubes are that they can be used at higher operating temperatures and give generally longer lives than metallic recuperators of similar construction. Their chief disadvantage is that they are prone to high leakage rates which result from the breakdown of the tube seals under the differential thermal expansion forces. To try and overcome this problem a recuperator design using flexible seals was developed, and this approach is described in British Pat. No. 1,244,911 and patent application number 20998/74. One arrangement consists basically of a number of parallel ceramic tubes mounted either horizontally or vertically across the waste gas offtakes from a furnace; the tubes being located at each end in holes in opposite monolithic refractory walls of the recuperator, with annular seals extending between the outer circumferential surface at the end of each tube and the wall. The ends of the tubes open into a series of header boxes which are fitted on the outside of the monolithic walls. The tubes can be made of silicon carbide which is a heat conducting material. Air to be heated in the recuperator is passed through the tubes thereby enabling heat from the waste gas in the offtake to be transmitted to the air. The seals described comprise a plurality of rings of different overall diameter of compressed fibrous refractory material held in the compressed state by a locking ring which cooperates with the recuperator wall by means of a bayonet fitting within the wall block hole. A thrust washer may be positioned between the compressed rings and the means for maintaining the rings in the compressed state, to minimise any abrasive action on the rings themselves.

It is an object of the invention to provide a means of improving the sealing of the tubes into the recuperator walls.

According to one aspect of the invention a recuperator is provided which has recuperator tubes extending between opposite walls of the recuperator, and seals fitting between the cylindrical surfaces of the recuperator tube ends and corresponding openings in the walls of the recuperator, said seals each comprising an annular coil of ceramic fibre blanket, which blanket has been radially compressed so that the coil has an outer diameter less than the diameter of the corresponding cylindrical opening in the recuperator wall and has been treated with a heat fugitive substance to hold the blanket in its internally compressed condition such that upon heating of the seal, the heat fugitive substance is destroyed and the blanket expands to compressively seal the gap between the outer cylindrical tube surface and its corresponding wall opening.

According to a further aspect of the invention a method is provided for manufacturing a seal suitable for fitting between the outer cylindrical surface of a recuperator tube end and an opening in the wall of a recuperator, said method including loosely wrapping a compressible resilient blanket of ceramic fibers around a mandrel, radially compressing said blanket and applying a heat fugitive substance to the blanket so as to temporarily hold it in its compressed state until it is heated.

According to a further aspect of the invention a seal is provided which is suitable for fitting between the outer cylindrical surface of a recuperator tube end and an opening in the wall of a recuperator, said seal comprising an annular coil of ceramic fibre blanket, which blanket has been radially compressed so that the coil has an outer diameter less than the diameter of the cylindrical opening in the recuperator wall and has been treated with a heat fugitive substance to hold the blanket in its compressed condition, such that upon heating of the seal the heat fugitive substance is destroyed and the blanket expands to seal the gap between the outer cylindrical tube surface and the wall opening.

The annular coil of which the seal is comprised may be formed by spirally winding the ceramic blanket on to a cylindrical former mounted on the mandrel. The former may comprise the inner lap of the coil impregnated with heat fugitive resin. Alternatively the coil may be formed in a single lap wound around a cylindrical former. The spiral of ceramic fibre blanket preferably is radially compressed after it has been fully wound around the former.

The fibre blanket may be impregnated with a heat fugitive resin prior to, during or after the coil has been formed. The heat fugitive resin then sets to hold the blanket in its compressed condition. Preferably the fibre blanket may be held in its compressed condition by means of a film of heat fugitive material wound around a coil or blanket in which the fibers are not impregnated with heat fugitive resin. In a further alternative, the blanket may be held in its compressed condition by a film of heat fugitive material interposed between each lap of the blanket.

The former around which the ceramic fibre blanket is wrapped may itself be combustible. The former may be supported during manufacture of the seal by a collapsible mandrel.

DETAILED DESCRIPTION OF PREFERRED EMBODIMENTS

Embodiments of the invention will now be described, by way of example only, with reference to the accompanying drawings.

DETAILED DESCRIPTION

Figure 1:
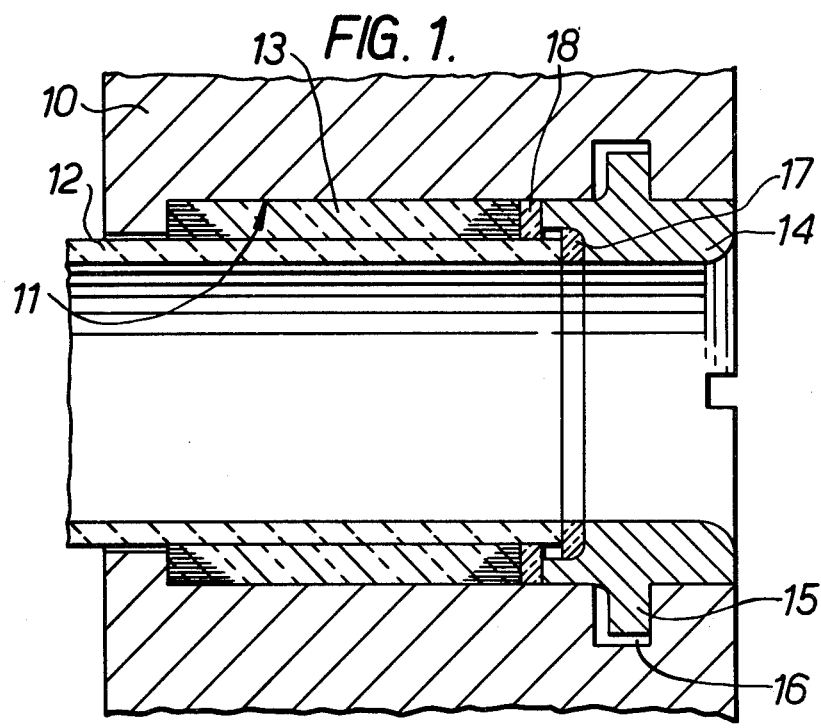
FIG. 1 shows a side elevation in cross-section of a recuperator wall with a recuperator tube end positioned in an opening in the wall.

In FIG. 1, a side wall 10 of a recuperator has a cylindrical opening 11 extending through it. The opening 11 is stepped inwardly towards the innermost side of wall 10. A ceramic tube 12 is positioned in the opening 11 such that the tube end extends about two-thirds through the opening 11. In a typical recuperator installation, there will be a number of tubes 12 extending parallel to one another and communicating with header boxes (not shown) on the respective outsides of the opposite recuperator walls 10. The recuperator and the tubes, of course, operate at elevated temperatures.

Figure 2:
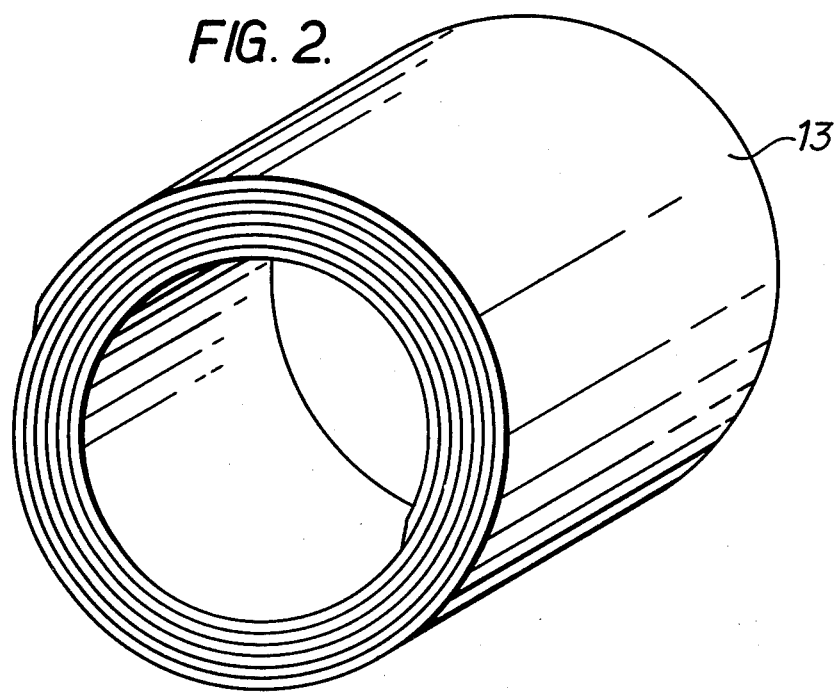
FIG. 2 shows a perspective view of one type of seal for insertion between the tube end and the wall opening of FIG. 1, and FIGS. 3 to 9 illustrate schematically methods of making seals for insertion between the recuperator tube end and the wall opening of FIG. 1.

A ceramic fibre seal 13 fits between the outer cylindrical surface of the tube 12 and the cylindrical opening 11 so that seal 13 abuts the stepped portion of opening 11. The seal 13 comprises an annular coil of ceramic fibre blanket, which blanket has been radially compressed so that the coil has an outer diameter less than the diameter of the cylindrical wall opening 11, and has been impregnated with a heat fugitive resin to hold the blanket in its compressed condition. The seal may have a number of laps of blanket as shown in FIG. 2 or alternatively it comprises a single lap of relatively thick blanket. The seal 13 is held in place by an annular ceramic insert 14 which has a bayonet fitting 15 cooperating with recesses 16 in the opening 11. A buffer ring 17 is provided between the ceramic insert 14 and the end of tube 12, and a thrust washer 18 is fitted between the outer end of seal 13 and the ceramic insert 14 so as to minimize any abrasive action by the insert 14 on the seal 13.

The recuperator walls 10 heat up rapidly when the recuperator is put in line; the heat is transmitted to each seal 13 and the heat fugitive binder thus degrades or evaporates so that the compressed seal is freed to expand to fill the annular space between the end of tube 12 and the cylindrical opening 11, thereby providing a substantially gas-tight seal at the pressures concerned.

Figure 3:
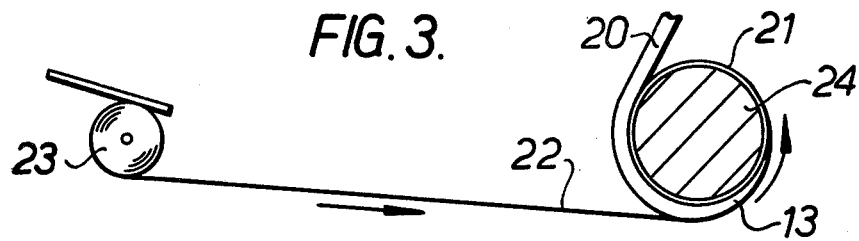

The seal 13 may be manufactured by a number of alternative methods. In FIG. 3, the seal 13 is made by wrapping fibre blanket 20 around a former 21 in spiral manner, each lap of the spiral being compressed radially as it is wound by a tensioned layer of adhesive plastic film 22 supplied from reel 23 and interleaved between the laps of the spiral. The fibre blanket 20 may have been previously soaked in water to make it more flexible, or alternatively the blanket may be dry. The former 21, which functions as a forming mandrel which is of combustible material, is mounted on a collapsible rotary support mandrel 24 during the production of the spiral. After the seal 13 has been formed, the seal 13 on its former 21 is removed from the mandrel 24. The former 21 supports seal 13 during storage, and thus prevents distortion or collapse of the seal.

Figure 4:
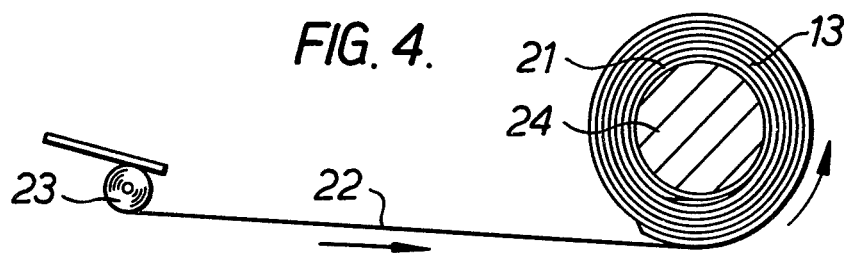

In the method shown in FIG. 4, the blanket is shown in a spirally wound seal 13 which is being compressed radially as a whole by a tensioned plastic film 22 which may be adhesive or non-adhesive. This method uses less film 22 than the method shown in FIG. 3 but may require a device (not shown) to assist in radially compressing the whole seal 13 prior to or during the application of the film 22.

Figure 5:
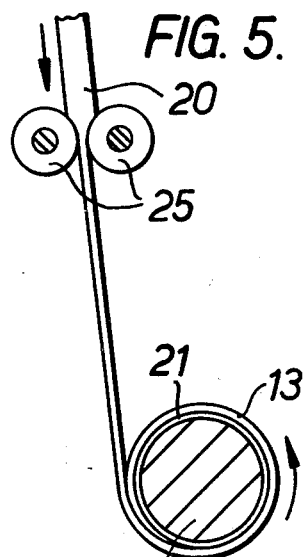

FIG. 5 shows a fibre blanket 20 which has been impregnated with a heat fugitive resin (which acts as a retardant to the fibre resilience) passing between a pair of pinch rolls 25 which compress the blanket 20. The resin is typically combustible or evaporates on the application of heat to the seal. The blanket 20 is then wound under moderate tension in a spiral manner onto a former 21 mounted on a collapsible support mandrel 24 and the completed spiral is held for a time on the mandrel 24 to allow the resin to set. The seal 13 or its former is then removed from the mandrel.

Figure 6:
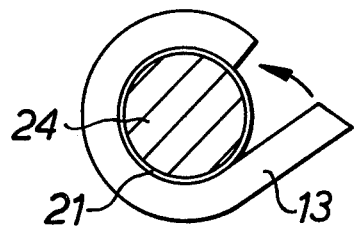
Figure 7:
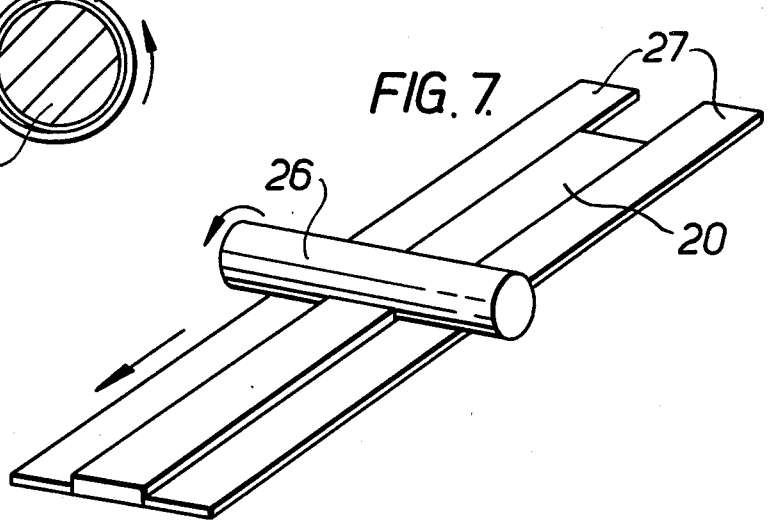

A single lap coil is shown in FIG. 6 being wound onto a former 21. The blanket 20 has been previously cut to the correct length for a single lap and is treated in the apparatus of FIG. 7 after impregnation with heat-fugitive resin. A squasher roll 26 runs on roll guides 27 mounted on a work-top (not shown), the length of blanket 20 being fitted between the guides 27. After squashing, the blanket 20 is wound around former 21 and held there until the resin has set. It is then removed from mandrel 24 and is suitable for use.

Figure 8:
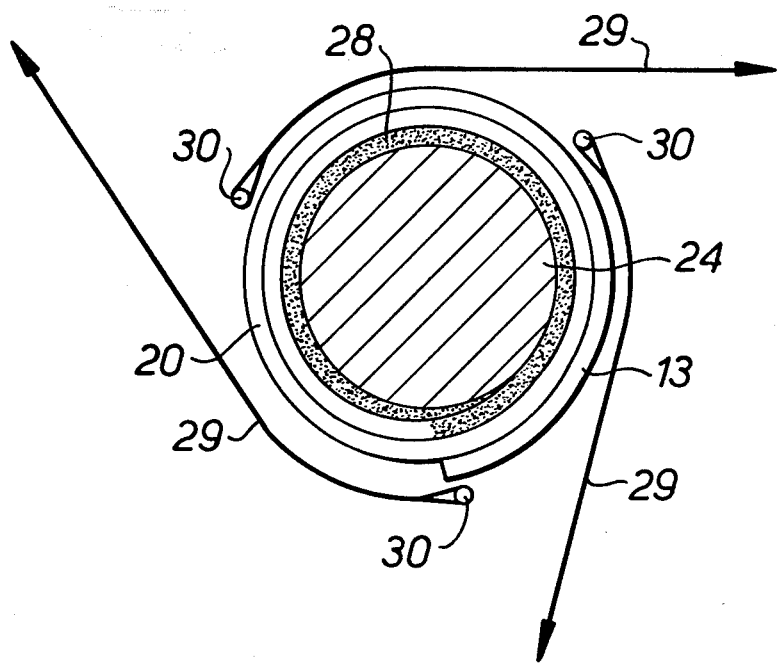
Figure 9:
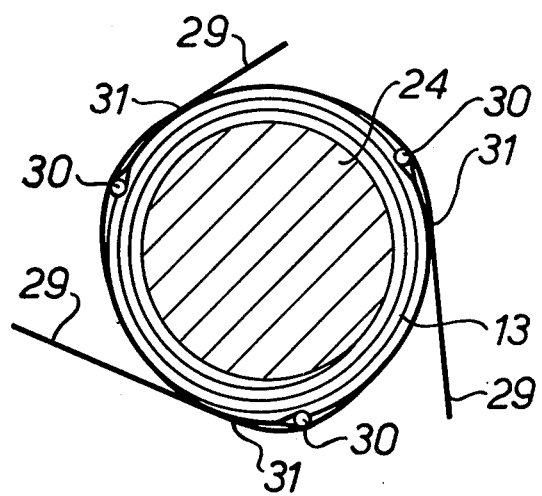

FIGS. 8 and 9 show another method of making a seal from a fibre blanket 20 previously cut to the required width and to a length sufficient to give the correct quantity of material. The seal 13 is made by loosely wrapping fibre blanket 20 around a collapsible support and forming mandrel 24 with the innermost lap 28 impregnated with a heat-fugitive resin. Three heat fugitive wraps 29 are attached to restraining bars 30 and wrapped around the periphery of the coiled blanket in such a way that each overlaps the preceding one. The wraps 29 are rotated and tightened in a device not shown, such that the seal 13 is compressed radially as a whole. After compression, as seen in FIG. 9, a heat fugitive resin 31 is applied to each of the overlaps between the three wraps 29. The seal 13 is held for a time on the mandrel 24 to allow the resin to set in both the innermost lap 28 and at the overlaps between the wraps 29. The excess wraps are then cut off, restraining bars 30 are slipped out parallel to the longitudinal axis of the seal, and the seal removed from the mandrel.

We claim:

1. A method of making an annular fibrous seal for high temperature recuperator tube applications, which seal is capable of radially expanding when first subjected to recuperator tube end operating temperatures to establish and maintain a compressed seal between the peripheral tube end area and the adjacent cylindrical recuperator wall opening into which the tube extends comprising:
    (a) loosely wrapping at least one layer of a compressible and resilient blanket of unbonded ceramic fibers about an annular forming mandrel;
    (b) providing means for stabilizing the form of the radially inner area of the fiber layer;
    (c) after wrapping, compressing the ceramic fibers radially uniformly on the mandrel to decrease their volume while not destroying the recuperative ability of the fibers to resiliently expand back to a volume substantially greater than their compressed volume when the compression is released by wrapping a retainer means exteriorly of the fibers for compressing and temporarily retaining the fibers in radially compressed condition, said retainer means being destructable at operating temperatures of the tube ends of the recuperator in which the seal is to be used; and
    (d) removing the compressed fibers and the retainer means from the mandrel.

2. The method according to claim 1, including the additional step of placing the compressed fibers with the temporary retaining means about a recuperator tube end between the tube end and adjacent cylindrical recuperator wall structure.

3. The method according to claim 1, the step of stabilizing the form of the inner area of the fiber layer comprising impregnating said inner area only with a settable resin that is destructable at said tube end operating temperatures.

4. The method according to claim 2, said resin being destructable by vaporization at said operating temperatures.

5. The method according to claim 1, the step of compressing the fibers by radially wrapping them after they have been wrapped on the mandrel comprises circumferentially wrapping them with overlapping layers of sheet material applied under tension and securing the sheet material in place over the fibers to maintain the fibers compressed, the sheet material and the means used to secure such material in place being destructable at said tube end operating temperatures.

6. The method according to claim 1, the step of stabilizing the form of the inner area of the fibers comprising impregnating said inner area only with a settable resin, and the step of compressing the fibers after they are wrapped on the mandrel comprising circumferentially wrapping them with overlapping layers of sheet material applied under tension after the fibers have been completely wrapped on the mandrel, and securing the sheet material to maintain the fibers in compression, the resin, the sheet material and the sheet securing means being destructable at said tube end operating temperatures.

7. The method according to claim 6, in which the step of securing the sheet material comprises bonding the overlapping sheets together using an adhesive that is destructable at said tube end operating temperatures.

8. The method according to claim 1, the step of stabilizing the inner area of the fiber layer comprising wrapping the fibers about a temporary annular former element, said former element serving as the forming mandrel for the ceramic fibers, and being destructable at said tube end operating temperatures.

9. A method of making an annular fibrous seal for high temperature recuperator tube end applications, which seal is capable of radially expanding when first subjected to recuperator tube end operating temperatures to establish and maintain a compressed seal between the peripheral tube end area and the adjacent recuperator wall opening into which the tube end extends, comprising:

(a) loosely wrapping multiple layers of compressible and resilient unbonded ceramic fibers about a forming mandrel, the form of the innermost layer of the fibers being stabilized by impregnating only the innermost layer with a settable resin that is destructable at tube end operating temperatures;

(b) compressing the fibers radially uniformly on the mandrel to decrease their volume while not destroying the ability of the fibers to resiliently expand back to a volume substantially greater than their compressed volume when the compression is released, the compression being carried out by circumferentially spirally winding overlapping layers of sheet material to the outer layer of the fibers and then tensioning the sheet material layers individually around the fibers, the sheet material being destructable at tube end operating temperatures;

(c) securing the sheet material in place over the fibers by means that are destructable at tube end operating temperatures, and;

(d) removing the compressed fibers and sheet material from the mandrel.

10. The method according to claim 9, the step of securing the sheet material in place comprising bonding the sheets together where they overlap using a settable resin, the sheet material and the resin being destructable at tube end operating temperatures.

* * * * *